C. SMEDLEY.
HONEYCOMB AND CAPPINGS MELTER.
APPLICATION FILED MAY 12, 1921.
1,405,023.
Patented Jan. 31, 1922.
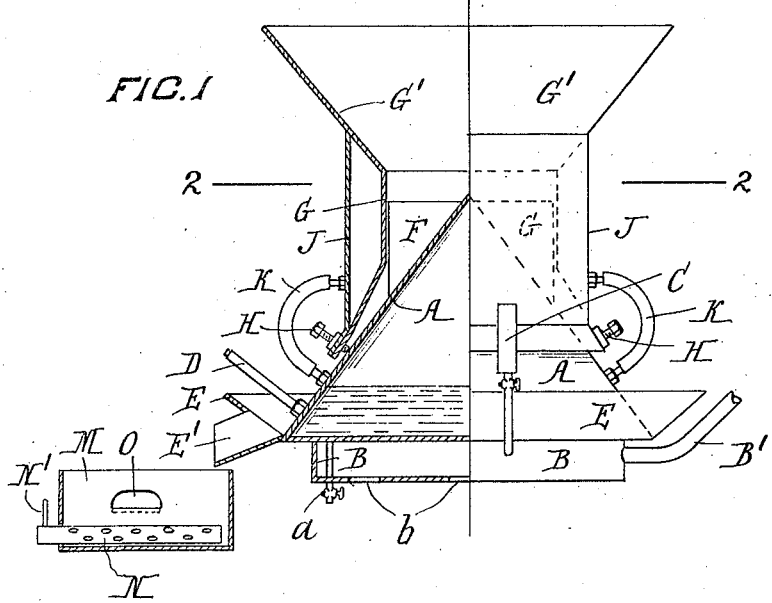
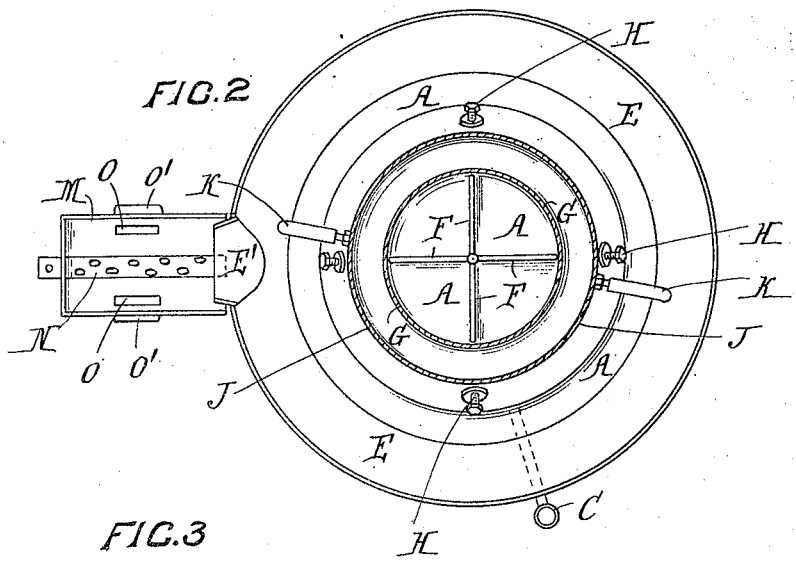
Inventor –
Cornelius Smedley,
By B. Singer, Atty.

UNITED STATES PATENT OFFICE.

CORNELIUS SMEDLEY, OF TE AWAMUTU, NEW ZEALAND, ASSIGNOR TO NEW ZEALAND CO-OPERATIVE HONEY PRODUCERS' ASSOCIATION, LIMITED, OF AUCKLAND, DOMINION OF NEW ZEALAND.

HONEYCOMB AND CAPPINGS MELTER.

1,405,023.  Specification of Letters Patent.  Patented Jan. 31, 1922.

Application filed May 12, 1921. Serial No. 469,046.

*To all whom it may concern:*

Be it known that I, CORNELIUS SMEDLEY, subject of the King of Great Britain, residing at Te Awamutu, in the Dominion of New Zealand, have invented a new and useful Improved Honeycomb and Cappings Melter, of which the following is a specification.

This invention has been devised with the object of providing an improved construction of apparatus for use in the melting of honeycomb and (or) cappings in order to melt the honey and wax and thereby to permit of the separation of the one from the other by any of the known methods. The invention also comprises means whereby the slumgum contained in the combined honey and wax may be automatically separated therefrom while they are in the hot melted condition so as thus to free them from such impurity before being allowed to settle to obtain the separation of the honey from the wax.

The machine or apparatus is illustrated in all its details in the accompanying drawings and will be hereinafter fully described in relation thereto.

In such drawings:—

Figure 1 is a half sectional elevation and half elevation of the full apparatus.

Figure 2 is a sectional plan thereof taken on the line 2—2 of Figure 1.

Figure 3 is a cross sectional elevation of the slumgum separator appliance.

The melter apparatus is formed by a cone shaped enclosed chamber A that is provided with a heater chamber B fixed beneath it and having apertures $b$ in its bottom to receive the burners of suitable heating lamps, as for instance, Primus stoves. This chamber B is furnished with a fume escape B' leading from its side to any desired point in order to carry away the burnt gases and fumes and deliver them well clear of the appliance.

The cone shaped chamber A is adapted to be charged with a supply of water through an inlet fitting C, which fitting will also act as a gauge to indicate the level of water within the chamber. Consequently when heat is applied to the heating chamber B in the manner described, this water will be converted into steam which will serve to heat the whole cone surface of the chamber A.

$a$ is a drain cock for emptying the chamber A when required.

The cone chamber A at its bottom is surrounded by a tray E having a discharging spout E'. This tray is designed to catch the matter flowing down the cone surface and to discharge it through the spout.

The upper portion of the cone's surface has a number of radially extending plates or fins F fixed to it.

Combined with these parts is a hopper formed by a ring G encircling the cone and at its bottom end supported on the cone and at its upper end extending to above the top thereof and opening out into a distended mouth G'. In this mouth the honeycomb frames may be placed or rested while the cappings are scraped from them. The bottom end of the ring is supported on the cone by means of screw pins H passing through it and resting on the cone surface. These pins will serve to adjust the level of the ring from the cone and thereby to regulate the width of the opening between the bottom ring edge and the cone's surface. The fin plates F serve, in addition to the heating purpose, to position and hold the trough ring centrally over the cone.

The ring G may be provided with a jacket J around its outside and the space enclosed thereby then connected to the inside of the cone chamber A by the flexible pipe connections K in order that the ring's internal surface may thus also be heated by the steam generated in such chamber, or introduced into it from some outside source.

In the working of the apparatus therefore, the matter being treated will fall through the hopper mouth G' and ring G into the space between its inside wall and the top of the cone A so that it will come under the influence of the heat thereof and also of the fins F and be melted and then run down the surface of the cone into the tray E at the bottom thereof. The melted matter will therefore pass through the space between the bottom edge of the ring G and the cone surface and by reason of the facility afforded for the regulation in the width of this space, any escape of the material from the melting zone before being reduced to the desired liquid state, may thus be prevented.

The melted wax and honey mixture is delivered from the tray E through its spout E' into any approved form of separator, for separating the honey from the wax, but in this invention, provision is made for the mixture being first passed through special apparatus for the separation of the slumgum contained in it, before it passes to the said wax and honey separating means.

This special slumgum separator appliance is shown in the drawings as combined with the melter apparatus. It consists of an open trough M of approved length and depth and made with its sides tapering inwards to a rounded bottom, as shown in Figure 3. Laid along within such bottom and projecting out through one end of the trough, is a pipe N the wall of which is perforated along the portion within the trough and the end of which, outside the trough, is left open. This pipe is left free so that it may slide longitudinally to and fro along the trough bottom and to permit of such movement being imparted to it, its outer end is furnished with the pin or lever N', by means of which it may be grasped.

Each side wall of the trough is made with an opening O therein, at a suitable height, the bottom of such opening having the overflow lip O' leading outward.

This appliance is arranged beneath the spout E' so as to receive the melted material falling therefrom. It therefore fills the trough, and the slumgum rises to the top and overflows through the openings O, while the combined honey and wax passes into the pipe N through the perforations and flows along the pipe to its outlet end, and thence into the usual separator appliance. Any blockage in the flow may be cleared by merely moving the pipe to and fro within the trough.

I claim:—

1. A honey comb and cappings melter consisting of an internally steam heated cone shaped chamber having a collecting tray around its bottom edge, combined with a hopper ring surrounding the cone chamber and supported by regulating means at its bottom edge, the distance of said edge above the comb surface being adjustable.

2. In a honey comb and cappings melter constructed as described in claim 1, providing the cone shaped chamber with vertically disposed fin plates radiating from its surface into the space between it and the hopper ring, substantially as and for the purposes specified.

3. In a honey comb and cappings melter constructed as described in claim 1, providing the cone shaped chamber with means for the introduction of water therein and with a heater chamber fixed beneath it constructed to receive and distribute the heat from suitable heating lamps, substantially as and for the purposes specified.

In testimony whereof, I affix my signature.

CORNELIUS SMEDLEY.

Witnesses:
DAVID BROWN HUTTON,
WILLIAM ERNEST HUGHES.